United States Patent [19]

Rodgers

[11] Patent Number: 5,622,422
[45] Date of Patent: *Apr. 22, 1997

[54] FLASHING SNORKEL AND SCUBA DEVICE

[76] Inventor: Nicholas A. Rodgers, c/o: Shaw & Co. SJO 892, P.O. Box 025216, Miami, Fla. 33102

[*] Notice: The term of this patent shall not extend beyond the expiration date of Pat. No. 5,330,282.

[21] Appl. No.: 439,375

[22] Filed: May 11, 1995

Related U.S. Application Data

[63] Continuation-in-part of Ser. No. 234,110, Apr. 28, 1994, which is a continuation-in-part of Ser. No. 72,390, Jun. 7, 1993, Pat. No. 5,330,282.

[51] Int. Cl.$^6$ ..................... F21V 25/00
[52] U.S. Cl. ..................... 362/158
[58] Field of Search ............. 362/158, 190, 362/191, 108, 103, 205, 276, 802; 43/17.5, 17.6

[56] References Cited

U.S. PATENT DOCUMENTS

| | | |
|---|---|---|
| 2,151,938 | 3/1939 | Ramsey .................... 362/158 |
| 2,361,414 | 10/1944 | Ramsey .................... 362/158 |
| 2,520,503 | 8/1950 | Henning .................... 240/59 |
| 2,765,481 | 10/1956 | Manhart .................... 362/158 |
| 2,971,081 | 2/1961 | Shimizu .................... 362/158 |
| 3,323,117 | 5/1967 | Mason .................... 362/158 |
| 3,559,224 | 2/1971 | Shimizu .................... 362/158 |
| 4,175,348 | 11/1979 | Ray . |
| 4,227,331 | 10/1980 | Ursrey et al. . |
| 4,250,650 | 2/1981 | Fima . |
| 4,779,174 | 10/1988 | Staten .................... 362/158 |
| 4,848,009 | 7/1989 | Rodgers . |
| 5,034,847 | 7/1991 | Brain .................... 362/802 |
| 5,070,437 | 12/1991 | Roberts .................... 362/158 |
| 5,188,447 | 2/1993 | Chiang et al. . |

Primary Examiner—Kurt Rowan
Attorney, Agent, or Firm—Dowell & Dowell

[57] ABSTRACT

A scuba or snorkel device with a circuit will turn on a light (preferably an LED) one or more times over a timed flash interval but will respond to a further closure of said switch during the flash interval. A circuit is provided to prevent response to such switch if two probes do not sense that the probe is in water. The circuit preferably will time a longer interval and turn on the light if the motion responsive switch is not actuated over the longer interval.

21 Claims, 3 Drawing Sheets

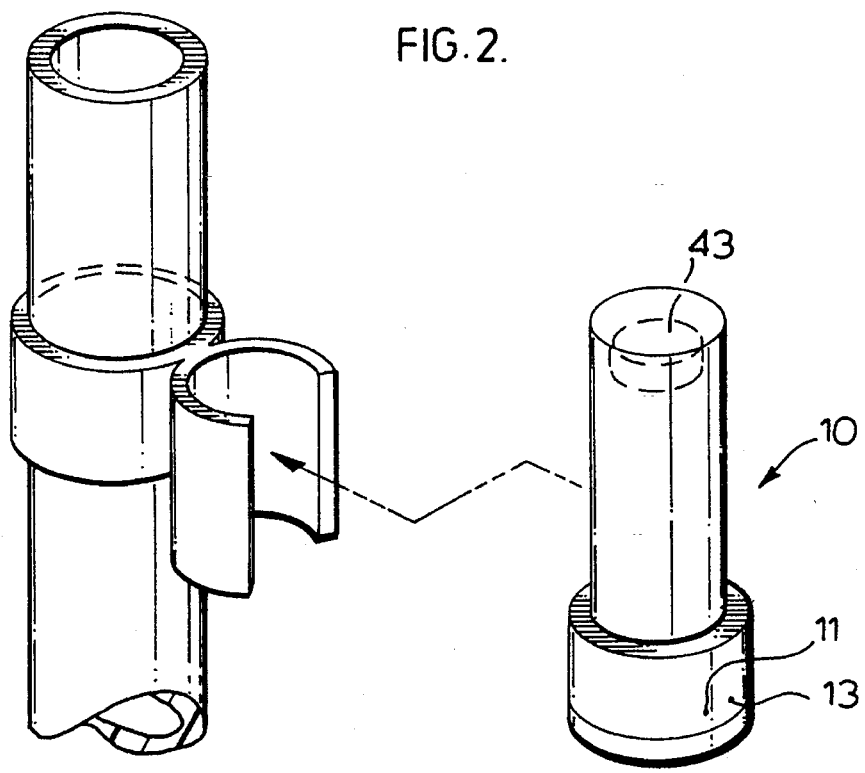
FIG. 2.
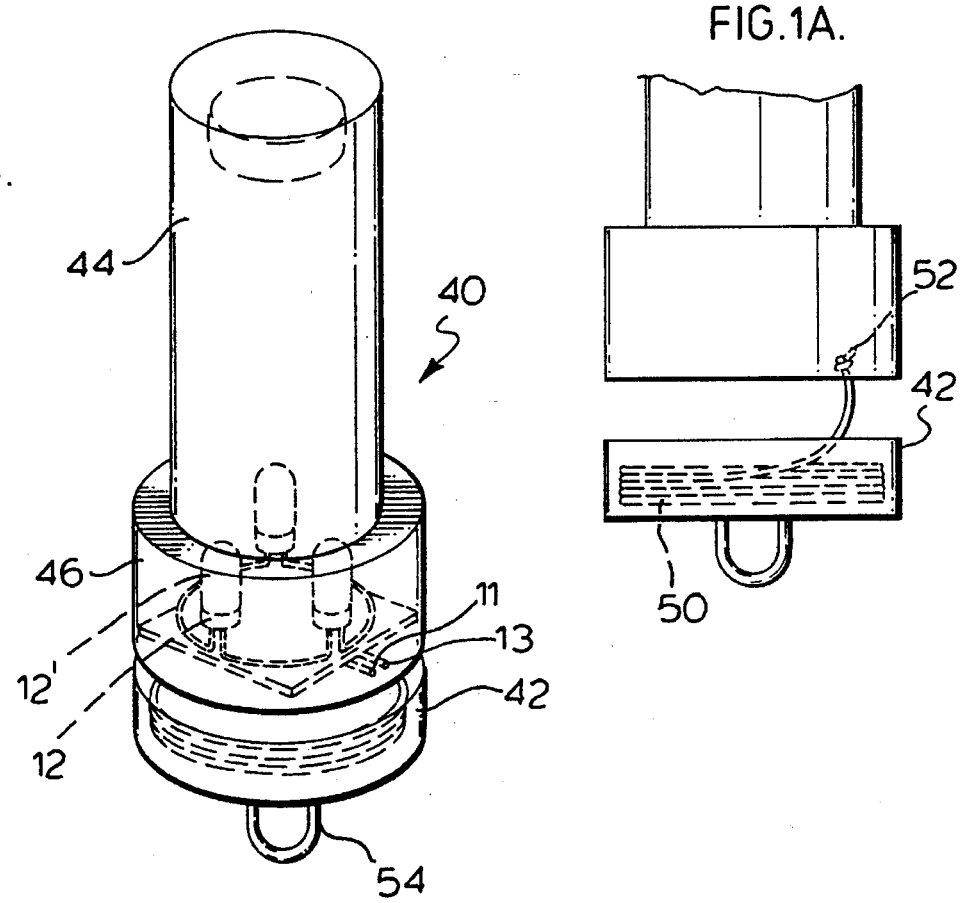
FIG. 1.
FIG. 1A.

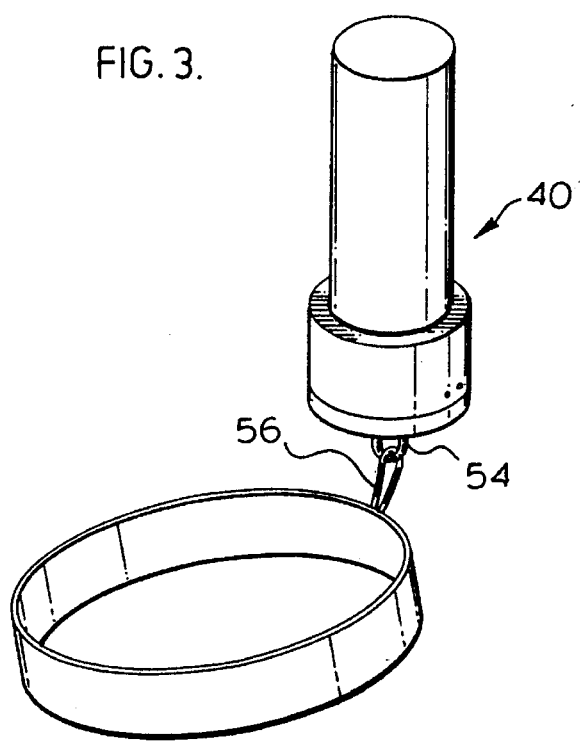
FIG. 3.
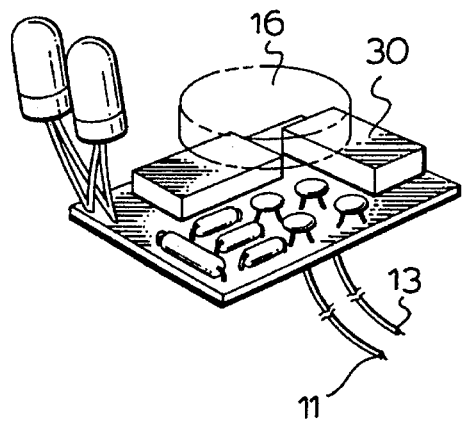
FIG. 6.
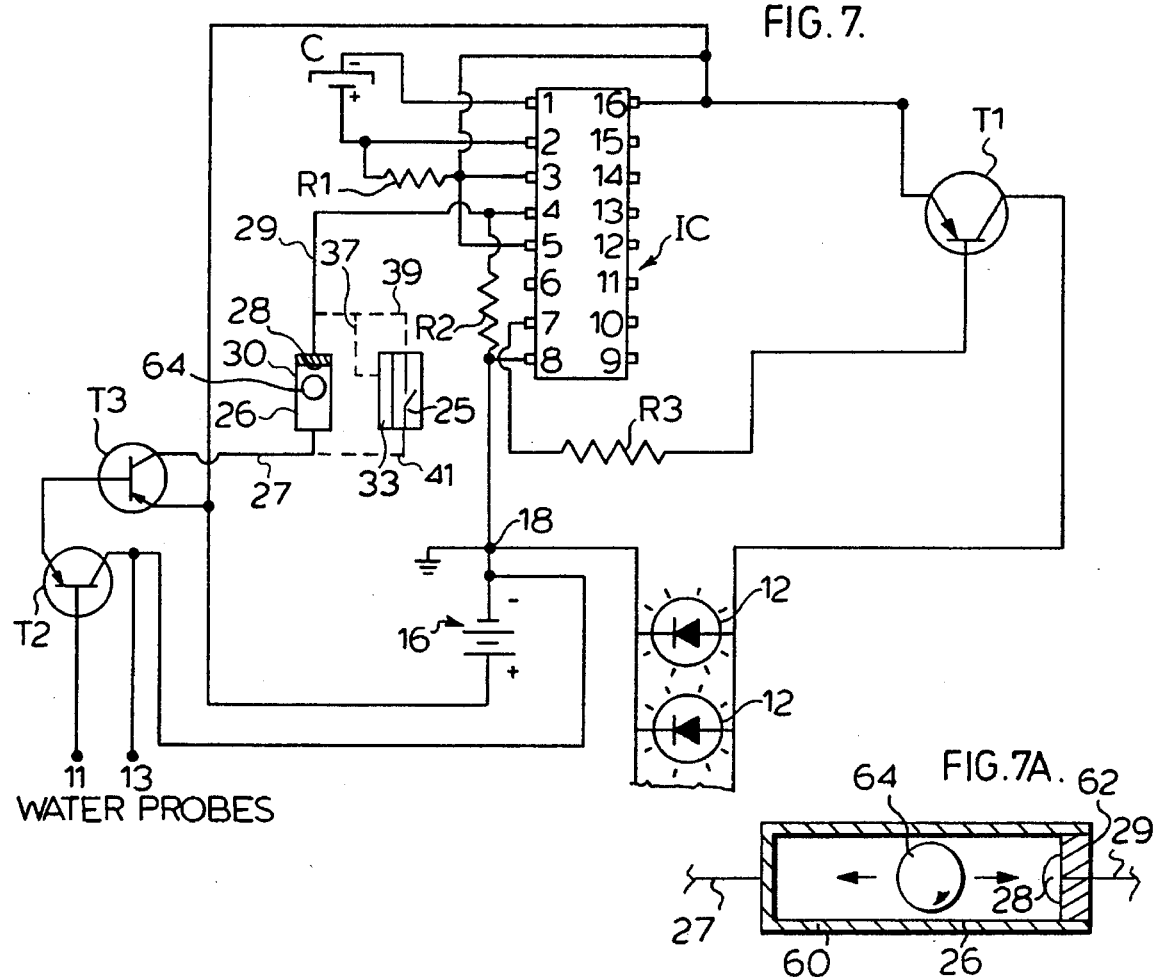
FIG. 7.
FIG. 7A.

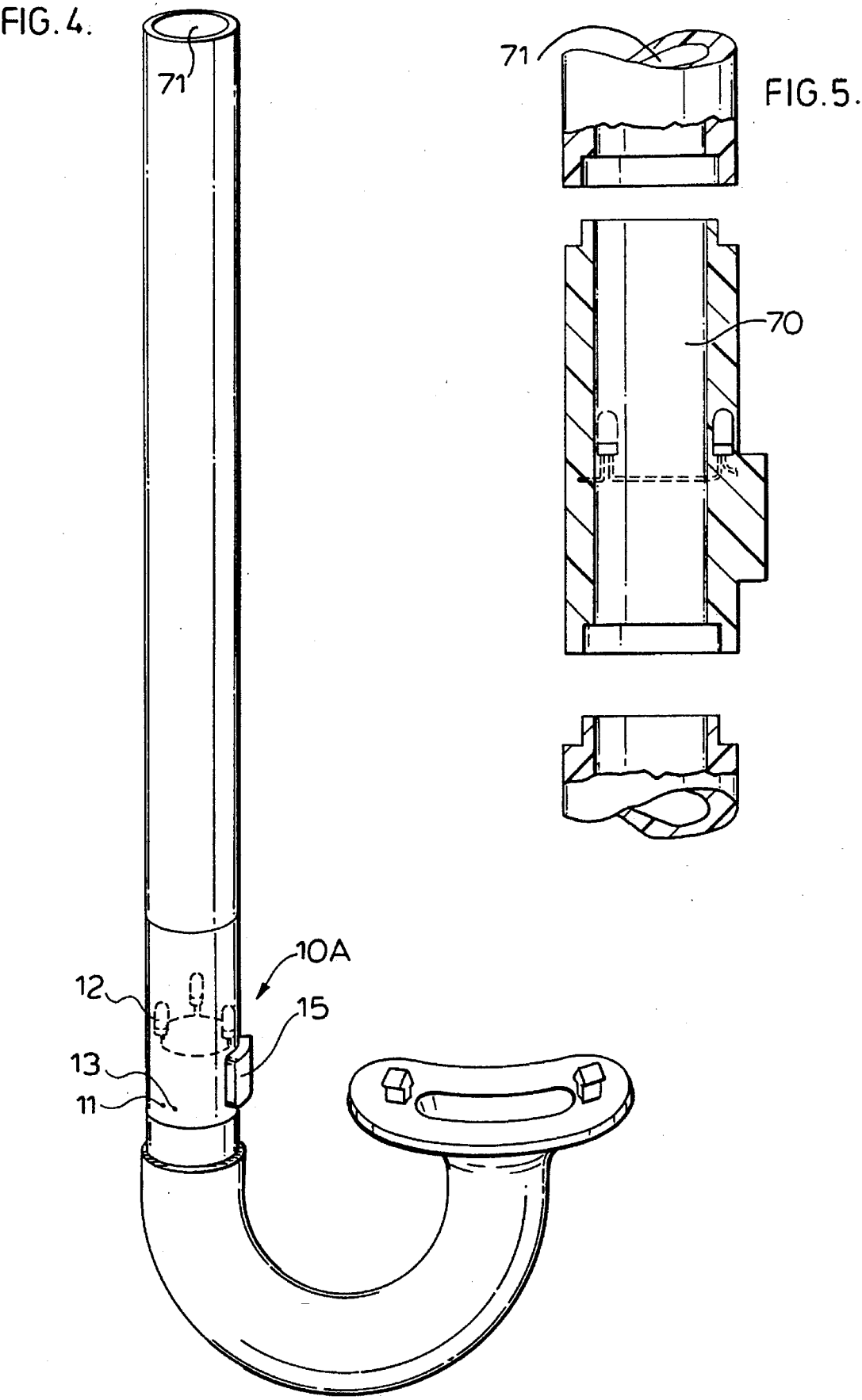

FLASHING SNORKEL AND SCUBA DEVICE

This is a continuation in part of application Ser. No. 08/234,110 filed Apr. 28, 1994 which is a continuation in part of application Ser. No. 08/072,390 filed Jun. 7, 1993 now U.S. Pat. No. 5,330,282.

This invention defines an assembly containing a light for use by swimmers such as snorkelers and scuba divers. The light is useful for illumination and for indicating the location of the swimmer.

Although it is not desired to limit the scope of the invention to embodiments where the light is a light emitting diode ('LED'), it is true that, I have found that an LED is the best light for use with the invention since it requires relatively low energy and provides relatively high illumination values for the energy used.

In accord with the invention the light has ON and OFF states and is located in a body forming the assembly or part thereof which allows the emission of illumination from said light into the water normally surrounding said body, a circuit including circuit timing means for timing a short or 'flash' interval. During the 'flash' interval the circuit may be arranged so that the light gives a single flash or so that the light gives two or a sequence of flashes. A motion responsive switch is responsive to a transition from disconnected to connected states. The circuit is responsive to a transition from disconnected to connected states when said light is OFF to connect said light to said circuit for the flash interval and then disconnect it. The circuit may be designed to cause said light to flash one or several times during the flash interval.

The circuit therefore avoids battery wear by preventing the light being ON for more than the flash interval, even if the switch remains for a longer time in the connected state.

The assembly provides, particularly when the light is an LED, illumination for the swimmer, adequate for his use, and provides, to others, an indication of the swimmer's position.

In a preferred embodiment of the invention, the body is made buoyant so that it will rise to the surface of the water and float to give a surface indication of the diver's position. The body, in this embodiment, may be attached to the swimmer or to the remainder of the assembly, by a line or lanyard and the remainder of the assembly, if used, is attached to the swimmer or his costume.

In a further preferred embodiment of the invention, the body is shaped to form an extent of a snorkel tube.

In a further preferred aspect, the assembly is formed with a buoyant body containing the circuitry, light, motion responsive switch and timing means, and a capsule is formed with a coil of line attached at one end to the capsule and at the other end to the body. The body is usually releasably attached to the capsule. In this way the body if released from the lower will, if buoyant, float to the surface (attached by the line), and give an indication of the swimmer's location. The body may also be used as a marker displaced from the swimmer but attached to him.

In a further preferred aspect of the invention the circuit includes a pair of probes exposed to the surrounding waters. This alternative circuitry includes means for preventing the light being ON unless the probes are in water. Thus power is saved since the light cannot be turned ON when the body is out of the water.

In a further aspect of the invention, the circuit includes inactivity timing means operable to cause the light to be connected to the circuitry to come ON after a predetermined interval of inactivity by the swimmer as signalled by the absence of disconnect to connect transitions of the motion responsive switch for the inactivity interval which inactivity interval is long relative to the flash interval.

In the drawings:

FIG. 1 is a perspective view of an assembly in accord with the invention,

FIG. 1A shows a detail of the components in FIG. 1,

FIG. 2 shows the apparatus for attachment to the outside of a snorkel tube,

FIG. 3 shows the assembly attached to a scuba diver's wrist band,

FIG. 4 shows an assembly in accord with the invention shaped to form an extent of a snorkel tube, FIG. 5 shows an exploded cross-section of the assembly of FIG. 4, FIG. 6 is a schematic view generally indicative of the physical arrangement of circuit elements, FIG. 7 indicates a preferred circuit for use with the invention, FIG. 7A shows a preferred motion responsive switch.

FIGS. 1 and 1A show a preferred form of the assembly having a body 40 and a capsule 42. The body is formed in a smaller diameter cylinder 44 and a wider diameter cylinder 46 arranged end to end preferably a single piece of molded plastic, encapsulating the circuitry, timer, switch, battery and LED's to be described. The circuitry is thus completely encapsulated, and protected from the water except for the optional alternative of providing a pair of exposed probes 11,13 (connected to the circuitry) for sensing the presence or absence of Water surrounding the assembly. The body may be transparent since the light is to be transmitted from the encapsulated LED to the body's exterior but is preferably translucent since the translucent plastic better spreads or diffuses the light emitted by the LED's to illuminate the surroundings or to indicate the position of the swimmer or the assembly to others. The body preferably has a specific gravity somewhat greater than water. Hence the body is preferably provided with an enclosed void or bubble 43 to ensure its buoyancy. If desired the buoyancy of the body is made large enough to render either the assembly of body and capsules, or the body alone, buoyant. Such buoyancy reduces the risk of loss of the assembly or body, respectively, since detachment from the swimmer will cause it to rise to the surface. The buoyancy of the body also may cause the flashing body on the water surface to indicate the presence of the swimmer as hereinafter described.

As shown in FIGS. 1 and 1A the capsule is a shallow, open-topped cylinder preferably adapted to be attached to the lower portion of the wider cylinder 46 of the body. The attachment is preferably achieved by a friction fit between the inner cylindrical surface of the capsule and the outer cylindrical surface of the body. However complementary screw threading or other releasable body-capsule attachment means for the capsule may be used.

The body and capsule are preferably designed so that, when assembled together, there is a space in the capsule.

In this capsule space a coil of (preferably) monofilament plastic line 50 is located in the space and the line is preferably tethered at one end to the capsule (not shown) and at the other end to the body at 52. By 'coil' is included any method of packing the line so that it may uncoil and extend when the body and lower capsule are separated.

FIG. 3 shows a ring clip 54 of the capsule connected by lanyard 56 to the wrist band of the user. The capsule may be otherwise attached to the swimmer's equipment. When the swimmer decides to signal his presence he may detach the body 40 and leave it in a remote location, connected by the line 50 or let it float to the surface of the water, signalling his presence below.

FIG. 6 indicates schematically the physical arrangement of the circuitry, including the battery 16 and the motion responsive switch 30, and the water probes 11,13. However no attempt is made in FIG. 6 to indicate the precise wiring connections since this is shown in the wiring diagram of FIG. 7.

The preferred circuitry for the assembly is shown in FIG. 7.

FIG. 7 shows circuitry including an integrated circuit used to time illumination of LED's 12 which may if desired be provided with lenses 12'. It will be understood that the switch 30, battery 16, LED's 12, preferably with lenses 12' may be located as indicated in FIGS. 1 or 4 or otherwise as long as they are positioned to provide light exterior to the body. The integrated circuit IC, PNP transistors T1, T2, and T3 and the remainder of the elements (with the exception of the ends of probes 11 and 13) shown in FIG. 4 are encapsulated in the material of the lure, but in any event are contained in a waterproof container 31 so that they cannot be contaminated.

Preferred values for the circuit elements are as follows:
- IC - INTEGRATED CIRCUIT #RR8503 MC14528
- T1 - PNP TRANSISTOR #2N3906
- T2 - PNP TRANSISTOR #2N3906
- T3 - PNP TRANSISTOR #2N3906
- C - CAPACITOR .47 τF at 30V
- 16 - BATTERY 3V
- 12 - LIGHT SOURCE (LED)
- R1 - RESISTOR 1 MEGOHM ⅛w
- R2 - RESISTOR 1 MEGOHM ⅛w
- R3 - RESISTOR 1 MEGOHM ⅛w The motion responsive switch 30 preferably comprises a conducting cylinder 60 open at one end. The closed end of the cylinder 60 is connected to line 27 and forms contact 26. The open end of the conducting cylinder 60 is closed by an insulator 62. A contact 28 is connected to line 29 through the insulator. A conducting ball 64 is dimensioned both to roll in the cylinder and at one end to electrically connect contacts 28 and 26 to close the circuit between lines 27 and 29. In other positions of the ball, the circuit is open between terminals 26,28.

Other motion responsive switches such as mercury switch may be used.

(The integrated circuit and transistors referred to above are both available from Motorola Canada Limited, 3125 Steeles Avenue East, North York, Ontario, Canada.)

With the body stationary in the water, if ball 64 is not connecting contacts 26 and 28 of the body, the terminals 26,28 will be disconnected and the circuit quiescent but capacitor C will be charged to the value of battery 16 (here 3V). Pin 4 of the integrated circuit will be held at 0 volts which is the voltage arbitrarily designated at node 18. The integrated circuit IC will be in reset condition having the effect that there will be a positive voltage at pin 7, rendering the transistor T non-conducting and maintaining LED's 12 off. (With the body stationary, if the ball 64 is connecting contacts 26,28 the circuit will, after a flash interval connection to the LED's, will maintain the LED's in OFF position until the switch 30 again completes a disconnect to connect transition.

In series with the contacts 26,28 there is provided a normally open path from battery 16, (through the emitter-collector path of T3 and line 27 to the motion responsive switch,) controlled by probes 11 and 13 and transistors T2 and T3 connected as shown. Probe 13 is connected to grounded node 18. If probes 11 and 13 are in an air environment, there is no conduction path therebetween and hence there is no bias on the base of T2 which is therefore non-conducting, rendering T3 non-conducting. The emitter-collector T3 path thus acts as an open circuit and while such open circuit persists, the circuitry cannot be activated by a disconnected to connected transition caused by contacts 26,28. Thus LED's 12 cannot be lit by such transition when probes 11 and 13 are in air. This prevents the expenditure of battery energy when the device is not in the water.

On the other hand when probes 11 and 13 are immersed in water (and the circuitry may be adapted for fresh or sea water), the water establishes a conducting path between probes 11 and 13. This turns the base of T2 negative relative to the emitter to turn on T2. When T2 turns on, the requisite negative bias is then applied to transistor T3 turning it on. Turning on T3 closes the conducting path between the positive terminal of battery 16 to contact 26.

With T3 conducting, because probes 11 and 13 are in water the next following disconnected to connected transition of switch 30 contacts 26,28 will activate the circuitry as hereinafter described.

Thus with the assembly and probes 11 and 13 immersed in water, motion of the assembly causes ball 64 to move to connect contacts 26,28 to complete a connection (that is the switch 30 is changing state from disconnected to connected) between battery 16 and pin 4. The (binary 0-1) or 0V to 3V transition at pin 4 causes the integrated circuit to go to 'set' condition causing pin 7 of the integrated circuit to go to 0 volts. This causes transistor T1 to conduct, connecting the circuit to the LEDs turning LEDs 12 to ON. The set condition of IC connects pin 3 with node 18 and after a time interval (the 'flash interval' in the claims herein) determined by C and R1 the circuit is returned to reset condition, so that pin 7 returns to a positive value turning off T1 and thereby disconnecting battery 16 from LED's 12. This affects the extinguishing of LED's 12 (to 'OFF') and allowing C to recharge. The circuitry is further designed so that the motion responsive switch 30 must be disconnected and connected again before the integrated circuit can again be activated to 'set' state. When the switch 30 is connected again, the disconnected-connected transition occurs.

It will be appreciated that the 'ground' shown at node 18 is instrument ground only and is unconnected to anything outside the assembly. The choice of node 18 as 'ground' is somewhat arbitrary but assists on the description of the circuit.

Even if the probes are not used, so that the emitter-collector path of T3 is replaced by a closed connection and T2 and T3 omitted, the remainder of the circuitry shown in FIG. 3 transcends the need for an "off" physical attitude of the assembly, when stationary or not in use to conserve battery power, as it provides only brief connection of the circuitry to the LED's for the flash interval of the LED's, per disconnected to connected transition of the switch 30 contacts 26,28. This allows the assembly to be held or left where, due to the attitude of the body, contacts 26,28 are connected without causing more than illumination of the LED's over the flash interval and consequent battery 16 power depletion.

In summary then, (with probes 11,13 if used, in water) the LED's are turned ON if they are then OFF by the transition of the motion responsive switch contacts 26,28 from disconnected to connected state connecting battery power to the LED's across T, the LED's remain ON until turned off by the C,R, timing portion of the circuit at the end of the flash interval. (If contacts 26,28 become disconnected during the timed interval the circuitry is preferably designed to continue the LED's ON until the end of the interval.) The LED's are OFF after the end of the timed flash interval until a later disconnect to connect transition of terminals 26,28.

Obviously it is within the scope of the invention to use any other circuit, integrated or otherwise, designed to be activated by motion causing a disconnected to connected transition of the 26,28 contact connect the LED's for the flash interval to turn LED's 12 ON and to disconnect the LED's 12 at the end of the flash interval. Circuits to control the ON duration of the LED's are of particular importance for the reasons previously explained. (Integrated circuits are available which incorporate resistors R1, R2, R3 and capacitor C into a chip.)

If desired, the circuitry may be designed to provide that the LED's flash on and off more than once during the flash interval without disconnection at T1 until the end of the flash interval.

Obviously there is no limitation as to the type of assembly with which the invention may be used and the body-capsule assembly may be in accord with the preferred embodiment, or otherwise.

(It may be worthwhile to note that if probes 11 and 13 as used and contacts 26,28 were maintained in connected state at the time of immersion of the body, then immersion of the assembly would close the emitter-collector path through T3 and appear to the integrated circuit as a disconnect-to-connect transition of the terminals 26,28. However, it is extremely unlikely that contacts 26,28 would remain connected during such apparent transition and if it does occur, the delay circuit will control the connection time of the LED's, to the flash interval exactly as described for the disconnect-connect transitions of contacts 26,28 so that no disadvantages ensue and the advantages of the invention accrue.)

The dotted circuitry of FIG. 7 represents an optional additional safety feature to sensor-timer 33 which controls normally open switch 35. Switch 25 closed connects line 27 to line 29, by-passing motion responsive switch 30. The sensor-timer contains circuitry responsive to a disconnect-connect transition on Line 29. The timer 33 is adapted to reset at each such transition and to time an inactivity interval since the last transition.

Such interval between flashes is preferably of the order of 10 seconds but in any event will be long relative to the flash interval which is preferably about 12 microseconds and the inactivity interval is selected to indicate inactivity on the part of the swimmer and a possible dangerous situation.

The timer 33 is connected on line 37 to line 29 to time the interval between disconnect-connect transitions on line 29 and if such interval reaches the inactivity interval the timer closes switch 25. Closure of switch 25 acts on line 29 like the closure of switch 30 and causes the LED's 12 to come on for the flash interval. The signal on line 39 resets the timer. Thus the steady flash of LED's 12 at the inactivity interval is a sign that the swimmer is stationary and may be in difficulty.

In operation then, if the body is not in the water, the absence of conduction between probes 11 and 13 opens the connection across T3 and no inactivity control or circuit operation, or lighting of lights 12 can take place. When the body is immersed in water the immersion of probes 11 and 13 will connect power from the positive battery terminal to lines 27 and 41 respectively. Water motion will cause disconnect-connect transitions in the line 29. As a result of each disconnect-connect transition the circuitry will light LED's 12 one or more times over the flash interval. The timer 33 is reset by each disconnect-connect transition, sensed on line 29 along line 37 each such transition the timer will commence timing a new inactivity interval. The timer is reset with each disconnect-connect transition sensed from line 29.

When there is an interval between disconnect-connect transitions longer than the inactivity interval, the inactivity timer will close the switch 25 to cause the LED's to light for the flash interval. Thus the timer will cause flash interval illumination each time the timer times the inactivity interval.

This regular signalling at times corresponding to the inactivity interval will signal possible injury or incapacity of the swimmer. Flashing responsive to the motion of the motion responsive switch 30 will occur during normal activity of the swimmer.

FIG. 2 shows the assembly already described with a clip 70 for detachable attachment of the body 10 to a snorkel tube.

FIGS. 4 and 5 shows a translucent body 10A containing the circuitry, sensors and probes, and LED's operating as previously described but where the body is shaped to define a central air passage 70 and form part of the snorkel tube 71. Thus the body is shaped for nesting fitting with the conventional snorkel tube extents as best shown in FIG. 5. It is found that the extents, including the body extent may be retained by friction although mechanical interlocks, bayonet type interlocks or screw connections may be used if desired.

The LED's, and circuitry (at 15) are encapsulated in the walls of the body, the probes 11,13 are led to exposed ends at the outer surface of the walls and the wall extent between the LED's and the outside wall may be transparent but is preferably translucent. The physical arrangement of the circuit parts may be altered from FIG. 6 to compactly conform to the body shape.

As previously mentioned the circuitry of FIG. 7 is designed to connect the battery to the LED's across T1 for the flash interval. The circuitry is preferably designed so that the LED's are continuously ON during the flash interval. However it is also within the scope of the invention to design the circuitry so that the LED's flash on and off two or more times during the flash interval which corresponds to the conducting interval at transition T1.

I claim:

1. Underwater light assembly for swimmers comprising:

a body having:

a power source;

a circuit including circuit timing means for timing a flash interval;

a motion responsive switch responsive to movement of said body to perform alternate transitions between connected and disconnected states where it respectively connects and does not connect said battery to said circuit;

at least one light source having ON and OFF states, said circuit being responsive to the switch transition from disconnected to connected states connect said light to said circuit causing it to turn on, then disconnect it, after said flash interval determined by said circuit timing means;

a portion of said body between said source and the body's exterior being adapted to transmit light from said light source, from said body.

2. Underwater light assembly as claimed in claim 1 wherein said assembly is buoyant.

3. Underwater light assembly as claimed in claim 2 wherein a closed cavity in said body renders buoyant a part of said assembly which contains said source, switch and circuitry.

4. Underwater light assembly as claimed in claim 1 wherein said body is shaped to form a part of a snorkel tube by connection to portions of said tube forming the mouth-adjacent and the mouth-remote end, and shaped to define a central passage forming, when so connected, an extent of the passage in the snorkel tube.

5. Underwater light assembly as claimed in claim 1 in combination with a snorkel device and including means for detachably attaching said body to said snorkel device.

6. Underwater light assembly as claimed in claim 1 in combination with means for detachably attaching said body to a snorkeler.

7. Underwater light assembly as claimed in claim 6 wherein said assembly comprises a body and a capsule, wherein said body and said capsule include said means for detachable attachment to a snorkeler and said body is detachably attachable to said capsule.

8. Underwater light assembly as claimed in claim 7 wherein said body is buoyant.

9. Underwater light assembly as claimed in claim 8 wherein a closed cavity in said body renders said body buoyant.

10. Underwater light assembly as claimed in claim 7 wherein said capsule carries an uncoilable coiled supply of line attached at one end to said capsule and at the other end to said body.

11. Underwater light assembly as claimed in claim 8 wherein said capsule carries an uncoilable coiled supply of line attached at one end to said capsule and at the other end to said body.

12. Underwater light assembly as claimed in claim 9 wherein said capsule carries an uncoilable coiled supply of line attached at one end to said capsule and at the other end to said body.

13. Underwater light assembly, as claimed in claim 1 including a pair of conducting probes with ends exposed at the surface of said body, means connecting said probes in said circuit, said circuit being adapted to prevent said light being turned on when said probes are not immersed in water.

14. Underwater light assembly, as claimed in claim 2 including a pair of conducting probes with ends exposed at the surface of said body, means connecting said probes in said circuit, said circuit being adapted to prevent said light being turned on when said probes are not immersed in water.

15. Underwater light assembly as claimed in claim 1 wherein said circuit includes inactivity timing means adapted to time a predetermined inactive interval since the latest disconnected to connected transition which is long relative to the flash interval determined by circuit timing means.

16. Underwater light assembly as claimed in claim 2 wherein said circuit includes inactivity timing means adapted to time a predetermined inactive interval since the latest disconnected to connected transition which is long relative to the flash interval determined by said circuit timing means.

17. Underwater light assembly, as claimed in claim 7 wherein said circuit includes inactivity timing means adapted to time a predetermined inactive interval since the latest disconnected to connected transition which is long relative to the flash interval determined by said circuit timing means.

18. Underwater light assembly, as claimed in claim 8 wherein said circuit includes inactivity timing means adapted to time a predetermined inactive interval since the latest disconnected to connected transition which is long relative to the flash interval determined by said circuit timing means.

19. Underwater light assembly as claimed in claim 1 wherein said circuit causes multiple ON-OFF states of said light during said flash interval.

20. Underwater light assembly as claimed in claim 13 wherein said circuit causes multiple ON-OFF states of said light during said flash interval.

21. Underwater light assembly as claimed in claim 16 wherein said circuit causes multiple ON-OFF states of said light during said flash interval.

\* \* \* \* \*